(12) United States Patent
Lee et al.

(10) Patent No.: US 9,058,039 B2
(45) Date of Patent: Jun. 16, 2015

(54) METHOD AND APPARATUS FOR RECKONING POSITION OF MOVING ROBOT

(75) Inventors: Hyoung-ki Lee, Suwon-si (KR); Hyeon Myeong, Hwaseong-si (KR); Ki-wan Choi, Anyang-si (KR); Yong-beom Lee, Seoul (KR); Seok-won Bang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 2027 days.

(21) Appl. No.: 11/581,489

(22) Filed: Oct. 17, 2006

(65) Prior Publication Data

US 2007/0118248 A1  May 24, 2007

(30) Foreign Application Priority Data

Nov. 23, 2005 (KR) .................. 10-2005-0112556

(51) Int. Cl.
 *G06F 19/00* (2011.01)
 *G05D 1/02* (2006.01)

(52) U.S. Cl.
 CPC .............. *G05D 1/027* (2013.01); *G05D 1/0225* (2013.01); *G05D 1/0231* (2013.01); *G05D 1/0272* (2013.01); *G05D 1/028* (2013.01); *G05D 2201/0203* (2013.01)

(58) Field of Classification Search
 CPC .. G01S 5/0289; G05D 1/0225; G05D 1/0255; G05D 1/027; G05D 1/0272; G05D 1/028
 USPC ........................................................ 700/245
 See application file for complete search history.

(56) References Cited

U.S. PATENT DOCUMENTS

| | | | | |
|---|---|---|---|---|
| 5,032,775 A * | 7/1991 | Mizuno et al. | .................. | 701/25 |
| 5,416,713 A * | 5/1995 | Kameda et al. | ............... | 701/301 |
| 5,579,285 A * | 11/1996 | Hubert | ........................ | 367/133 |
| 6,374,155 B1 * | 4/2002 | Wallach et al. | ............... | 700/245 |
| 6,496,755 B2 * | 12/2002 | Wallach et al. | ............... | 700/245 |
| 6,763,057 B1 * | 7/2004 | Fullerton et al. | .............. | 375/141 |
| 2003/0028286 A1 * | 2/2003 | Glenn et al. | .................. | 700/245 |
| 2003/0212472 A1 * | 11/2003 | McKee | ........................ | 700/245 |
| 2004/0158354 A1 * | 8/2004 | Lee et al. | ...................... | 700/245 |
| 2005/0228613 A1 * | 10/2005 | Fullerton et al. | .............. | 702/150 |

FOREIGN PATENT DOCUMENTS

| | | |
|---|---|---|
| JP | 5-27832 | 2/1993 |
| JP | 11-295412 | 10/1999 |
| KR | 10-2005-0011568 | 1/2005 |
| KR | 10-2005-0063538 | 6/2005 |

* cited by examiner

*Primary Examiner* — John Q Nguyen
*Assistant Examiner* — Kyung Kim
(74) *Attorney, Agent, or Firm* — Harness, Dickey & Pierce, P.L.C.

(57) ABSTRACT

A method and apparatus for reckoning a position of a moving robot using dead-reckoning and range sensing. The method includes performing dead-reckoning to determine a variation state in accordance with motion of the moving robot, calculating an absolute position of the moving robot by sensing a distance between the moving robot and at least one fixed position, predicting an optimized current position of the moving robot using the variation state and the absolute position, determining whether the optimized current position is within a specified effective area, and correcting the optimized current position in accordance with the determined result.

29 Claims, 14 Drawing Sheets

TRANSMITTER SIDE

RECEIVER SIDE

SYNCHRONIZATION   T

METHOD AND APPARATUS FOR RECKONING POSITION OF MOVING ROBOT

CROSS-REFERENCE TO RELATED APPLICATION

This application is based on and claims priority from Korean Patent Application No. 10-2005-0112556 filed on Nov. 23, 2005 in the Korean Intellectual Property Office, the disclosure of which is incorporated herein by reference.

BACKGROUND OF THE INVENTION

1. Field of the Invention

The present invention relates to a position recognition technique, and more particularly to a method and apparatus for reckoning the position of a moving robot using dead-reckoning and range sensing.

2. Description of Related Art

Generally, robots have been developed for use in industry as a part of factory automation or to perform tasks that are repetitive, dangerous, and/or difficult. Robot engineering has been directed to space applications as well as humanized robots for home use. In addition, robots are being installed inside of people to cure ailments that cannot be cured by existing medical devices. Such robot engineering has received much attention as the most advanced field that will substitute for the biotechnology field as the most popular after the information revolution based on the Internet.

An example of a robot for home use includes a cleaning robot, which serves as a leading example of how heavy industry based robot engineering limited to industrial robots is being extended and transformed into light industry based robot engineering.

A cleaning robot generally includes a driving means for movement, a cleaning means for cleaning, and a monitoring means for sensing a front obstacle. The driving means includes a driving motor exerting a driving force, a caterpillar or wheel having a specified diameter, driven by the driving motor, and a driving control circuit controlling driving operation. The cleaning means includes a dust collector collecting dust to remove it, and a dust collecting control circuit controlling the dust collecting action. The monitoring means includes a monitoring camera for capturing a front obstacle, and a transmitter for transmitting an image captured by the monitoring camera to a user.

A conventional cleaning robot 1 of the above-described configurations is moved toward another direction within a limited area 2 if an obstacle appears through the monitoring means, as shown in FIG. 1. Accordingly, there results portions of the area where cleaning may not be performed. Also, a moving path of the cleaning robot 1 is inefficient.

A recent cleaning robot 3, as shown in FIG. 2, reckons its position using a certain means, and reduces cleaning time and energy consumption by moving through an optimal path after identifying a target area 2.

As described above, for a moving robot, such as a cleaning robot, which moves within a certain area, a technique for allowing the moving robot to accurately identify its position (i.e., accurate localization) is required. However, since users often unintentionally move the moving robot (so called "kidnapping"), a method of allowing the moving robot to reset its position is required.

BRIEF SUMMARY

An aspect of the present invention provides a method and apparatus for more accurately reckoning the position of a robot moving within a certain area.

Another aspect of the present invention provides a method and apparatus for reckoning the position of a moving robot, in which the position of the moving robot is reset even if an unexpected circumstance such as kidnapping occurs.

According to an aspect of the present invention, there is provided a method of reckoning a position of a moving robot, including: performing dead-reckoning to determine a variation state in accordance with motion of the moving robot; sensing a distance between the moving robot and at least one fixed position to calculate an absolute position of the moving robot; and predicting an optimized current position of the moving robot using the variation state and the absolute position.

According to an aspect of the present invention, there is provided a method of reckoning a position of a moving robot, including: predicting an absolute position of the moving robot using at least one sensor; determining whether the predicted absolute position is within an effective area calculated from a signal received from at least one fixed transceiver; and performing relocation in which the absolute position is reset, when the predicted absolute position is not within the effective area.

According to an aspect of the present invention, there is provided a method of reckoning a position of a moving robot, including: performing dead-reckoning to determine a variation state in accordance with motion of the moving robot; calculating an absolute position of the moving robot by sensing a distance between the moving robot and at least one fixed position; predicting an optimized current position of the moving robot using the variation state and the absolute position; determining whether the optimized current position is within a specified effective area; and correcting the optimized current position in accordance with a result of the determining.

According to another aspect of the present invention, there is provided an apparatus for reckoning a position of a moving robot, including: a dead-reckoning section determining a variation state in accordance with motion of the moving robot; a distance calculator calculating an absolute position of the moving robot by sensing a distance between the moving robot and at least one fixed position; and a state predictor predicting an optimized current position of the moving robot using the variation state and the absolute position as input values of a Kalman filter.

According to an aspect of the present invention, there is provided an apparatus of reckoning a position of a moving robot, including: a predictor predicting an absolute position of the moving robot using at least one sensor; a relocation determining unit determining whether the absolute position is within an effective area calculated from a signal received from at least one fixed transceiver; and a relocation unit performing relocation in which the absolute position is reset, when the predicted absolute position is not within the effective area.

According to an aspect of the present invention, there is provided an apparatus of reckoning a position of a moving robot, including: a dead-reckoning section performing dead-reckoning to determine a variation state in accordance with motion of the moving robot; a distance calculator calculating an absolute position of the moving robot by sensing a distance between the moving robot and at least one fixed position; a state predictor predicting an optimized current position of the moving robot using the variation state and the absolute position; a relocation determining unit determining whether the optimized current position is within a specified effective area; and a relocation unit correcting the optimized current position in accordance with a result of the determining.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
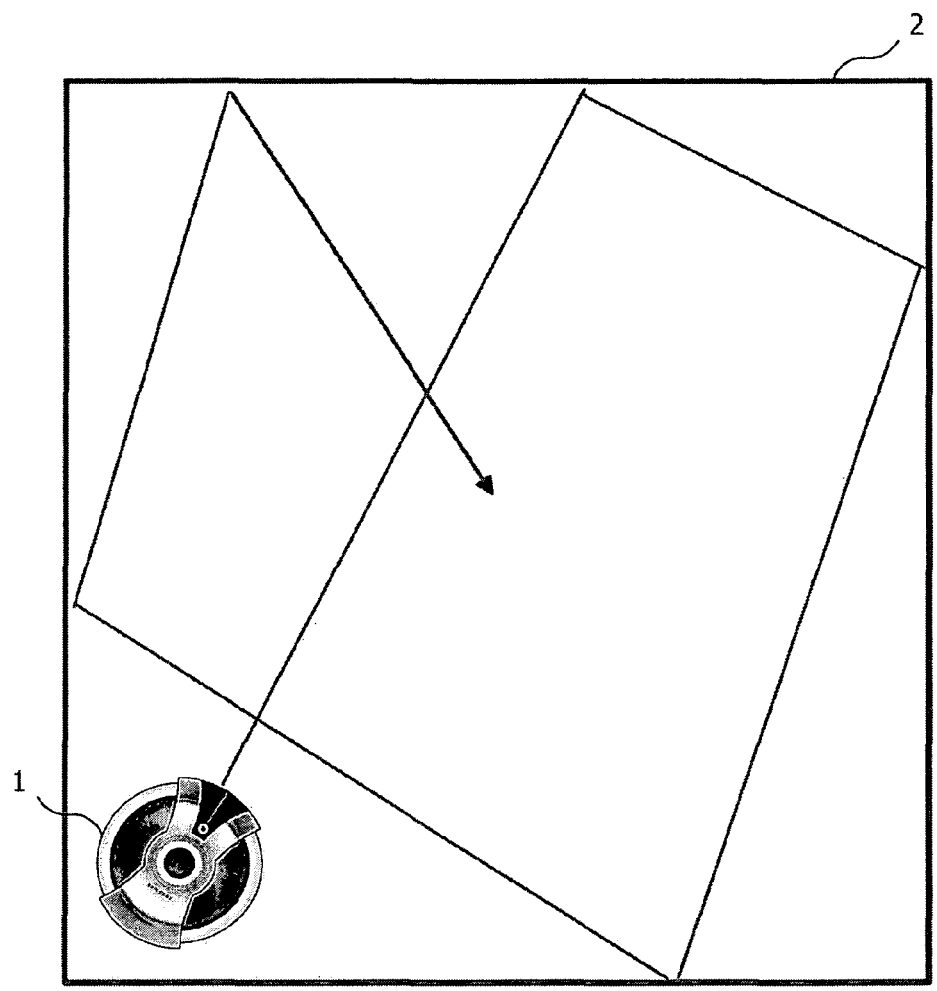
FIG. 1 is a view illustrating a motion track of a prior cleaning robot.
Figure 2:
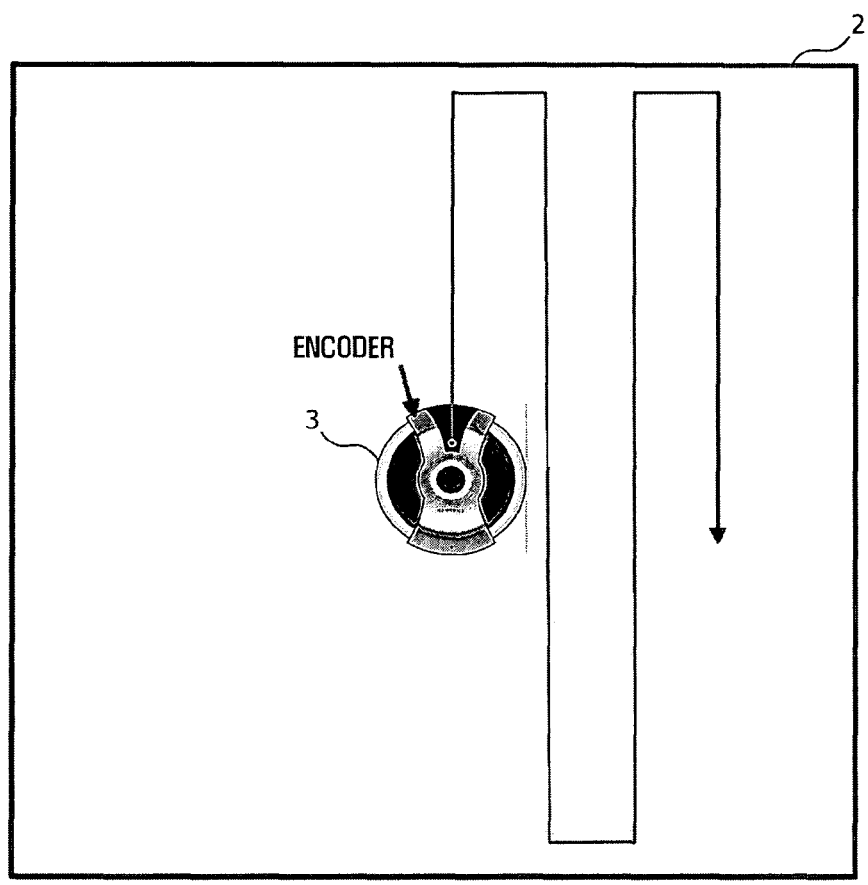
FIG. 2 is a view illustrating a motion track of a recent cleaning robot.

Reference will now be made in detail to embodiments of the present invention, examples of which are illustrated in the accompanying drawings, wherein like reference numerals refer to the like elements throughout. The embodiments are described below in order to explain the present invention by referring to the figures.

In the descriptions of embodiments of the present invention that follow, both dead-reckoning and range sensing are used to exactly reckon a position of a moving robot. If needed, another sensing is also used. Also, a method of reducing an error by correcting the difference between a reckoned value and a predicted value using a Kalman filter is used.

Dead-reckoning is used to sense a variation state in accordance with motion of the moving robot. Dead-reckoning is the process of determining a present position without using external references by using only information about direction of travel (i.e., course), speed, time traveled and distance traveled. Dear-reckoning can be achieved by an encoder and a gyroscope. The encoder senses rotational direction and speed of a traveling wheel, and the gyroscope senses angular speed of an object by identifying motion of inertial mass.

A reference object fixed in a space or a beacon is required for the range sensing. An accessory fixed to a wall or arranged by a user may be used as the reference object or the beacon. Since the moving robot generally uses a charging battery, it may be advantageous that the reference object is a charge station.

Figure 3:
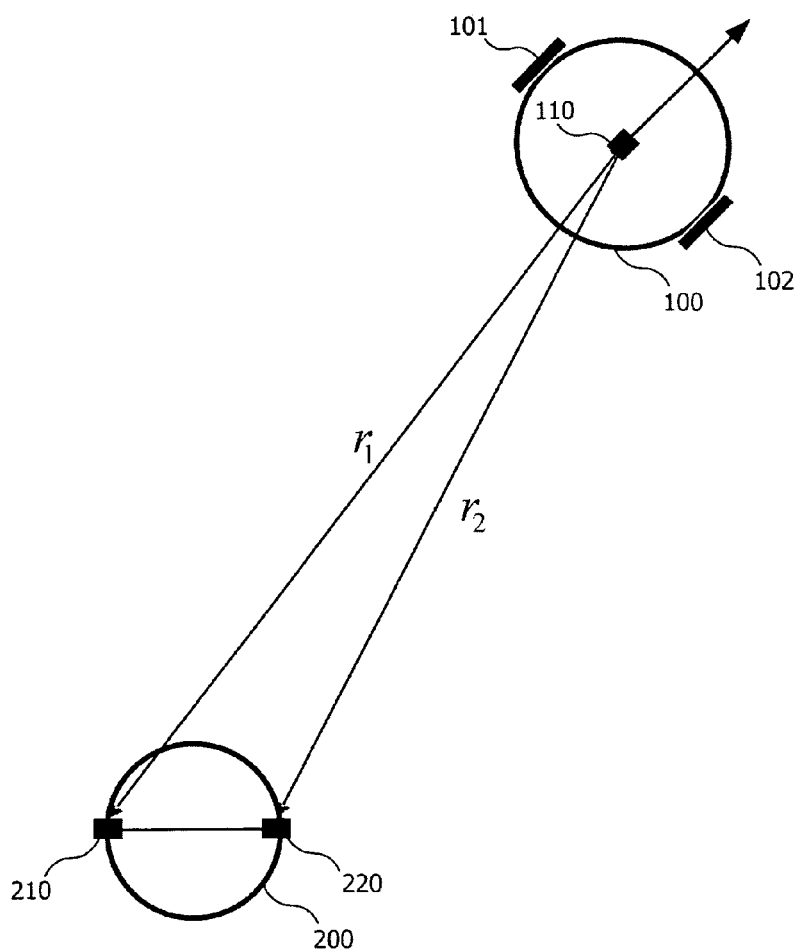
FIG. 3 is a view illustrating a moving robot and a charge station according to an embodiment of the present invention.

FIG. 3 is a view illustrating a moving robot 100 and a charge station 200 according to an embodiment of the present invention.

The moving robot 100 is provided with wheels 101 and 102 that enable traveling (i.e., movement) of the moving robot. The moving robot 100 is also provided with a transceiver 110 at a center portion. The charge station 200 is provided with two transceivers 210 and 220 spaced apart from each other by a specified distance. A signal is transmitted or received between the transceiver 110 of the moving robot 100 and the first transceiver 210 of the charge station 200 and between the transceiver 110 and the second transceiver 220 of the charge station 200, whereby the distances r1 and r2 between them can be obtained.

Figure 4:
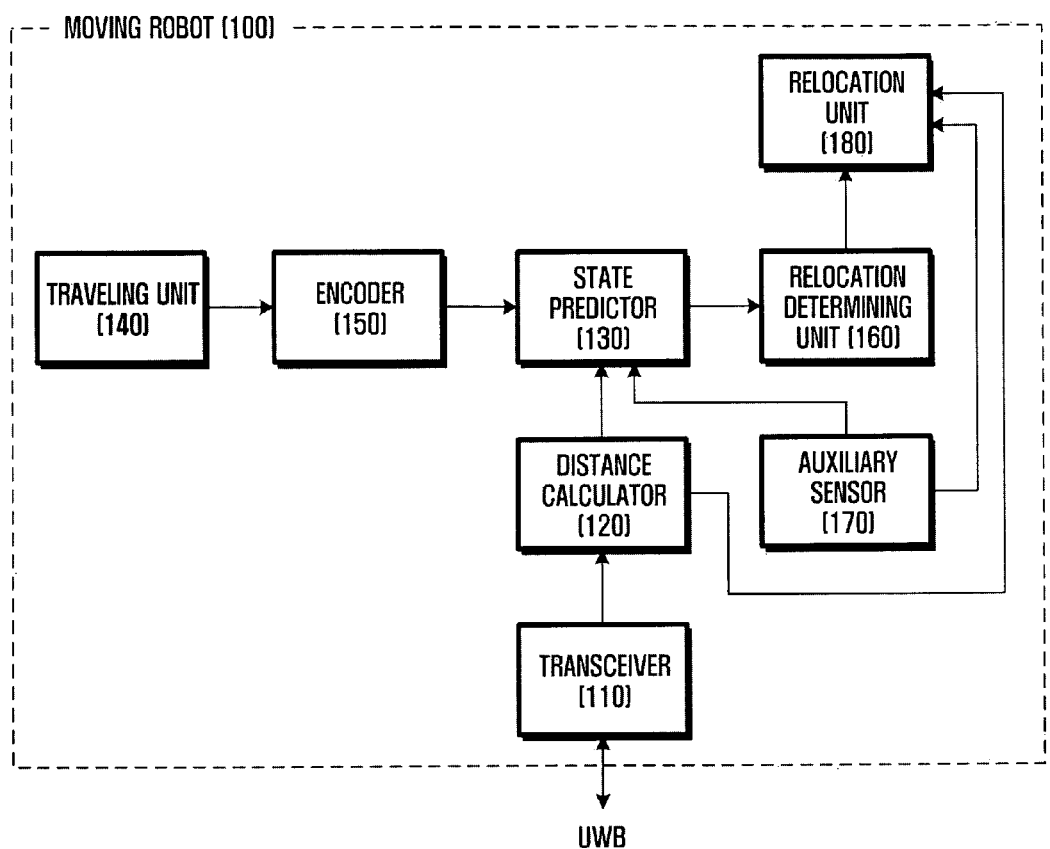
FIG. 4 is a block diagram illustrating a configuration of a moving robot according to an embodiment of the present invention.

FIG. 4 is a block diagram illustrating a configuration of the moving robot 100 according to the present embodiment. The moving robot 100 includes a transceiver 110, a distance calculator 120, a state predictor 130, a traveling unit 140, an encoder 150, a relocation determining unit 160, and an auxiliary sensor 170.

The transceiver 110 transmits and receives an ultra wide band (UWB) signal between the transceivers 210 and 220 of the charge station 200. However, it is to be understood that this is a non-limiting example and that an infrared (IR) signal, a radio frequency (RF) signal, or ultrasonic waves may also be used. The UWB signal is widely used as a distance sensor due to accuracy in range sensing and transmittance to an obstacle such as furniture or wall.

The distance calculator 120 calculates the distance between the moving robot 100 and the charge station 200 using timing of the signal transmitted and received by the transceiver 110. In the present embodiment, two UWB signals provided in the charge station 200 are used as a non-limiting example of the distance calculator 120.

Figure 5:
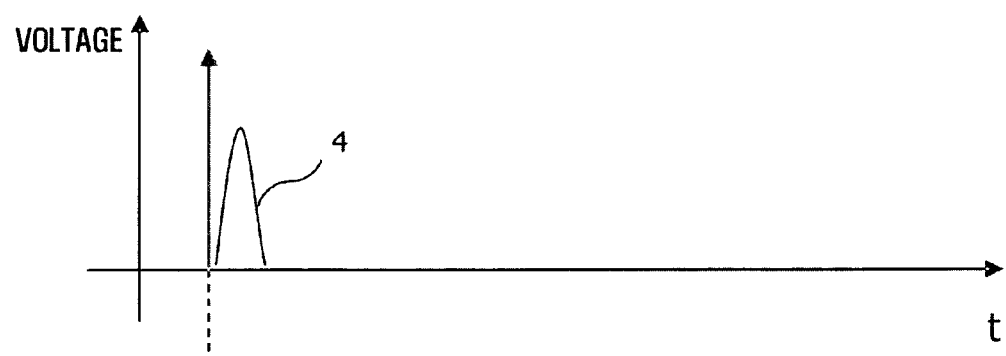
FIG. 5 is a view illustrating a process of transmitting and receiving a UWB signal.
Figure 5:
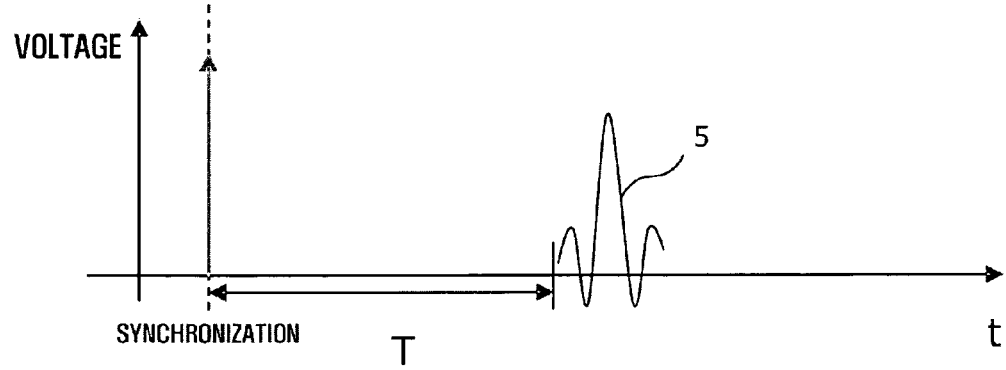

FIG. 5 is a view illustrating a process of transmitting and receiving the UWB signal. First, a transmitter side transmits a UWB pulse 4 having a specific intensity (voltage) to a receiver side. Then, the receiver side receives a distorted signal 5 from the UWB pulse 4 after the lapse of a specified time T.

Figure 6:
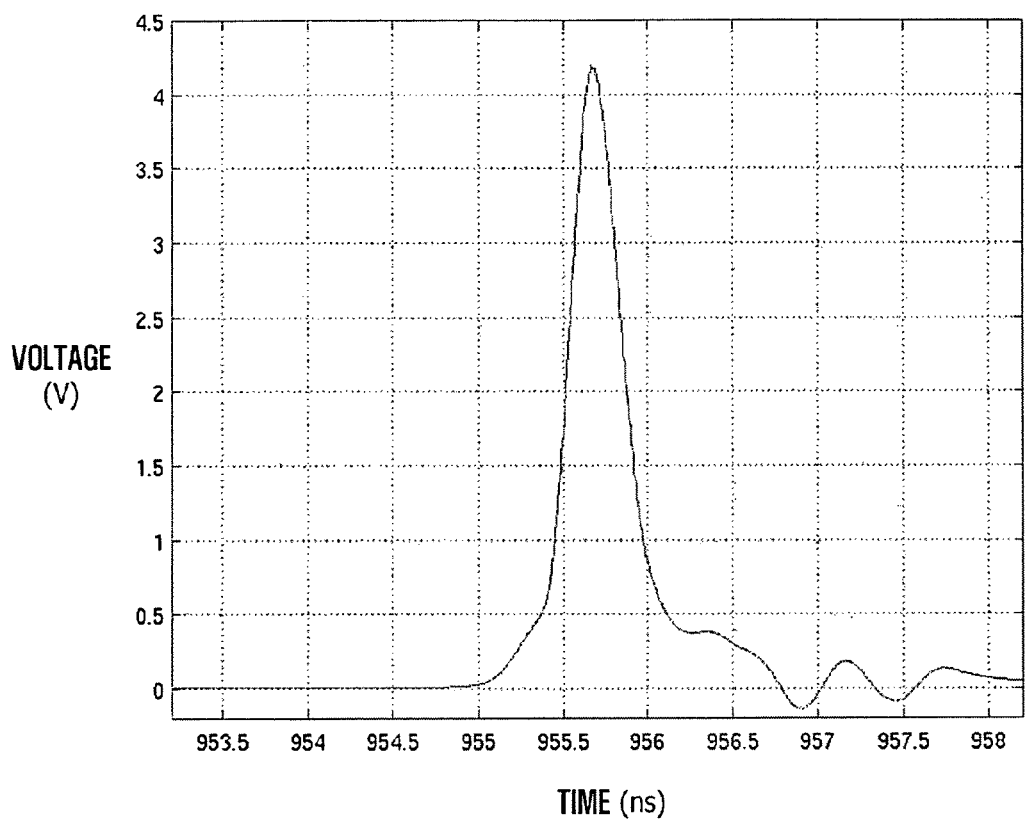
FIG. 6 is a view illustrating an example of a waveform of a UWB pulse transmitted from a transmitter side.
Figure 7:
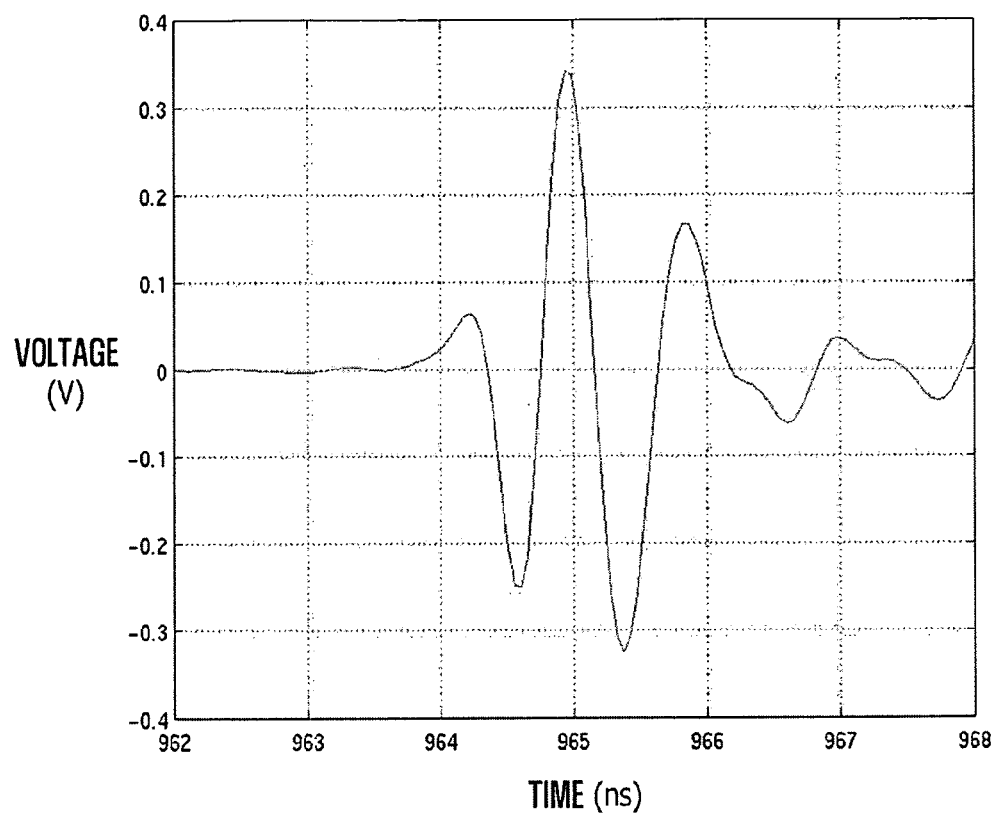
FIG. 7 is a view illustrating an example of a waveform of a UWB pulse received from a receiver side.

A waveform of the UWB pulse 4 transmitted from the transmitter side is shown in FIG. 6 while a waveform of the UWB signal 5 received from the receiver side is shown in FIG. 7. The waveform of FIG. 7 includes noise unlike the waveform of FIG. 6.

Figure 8:
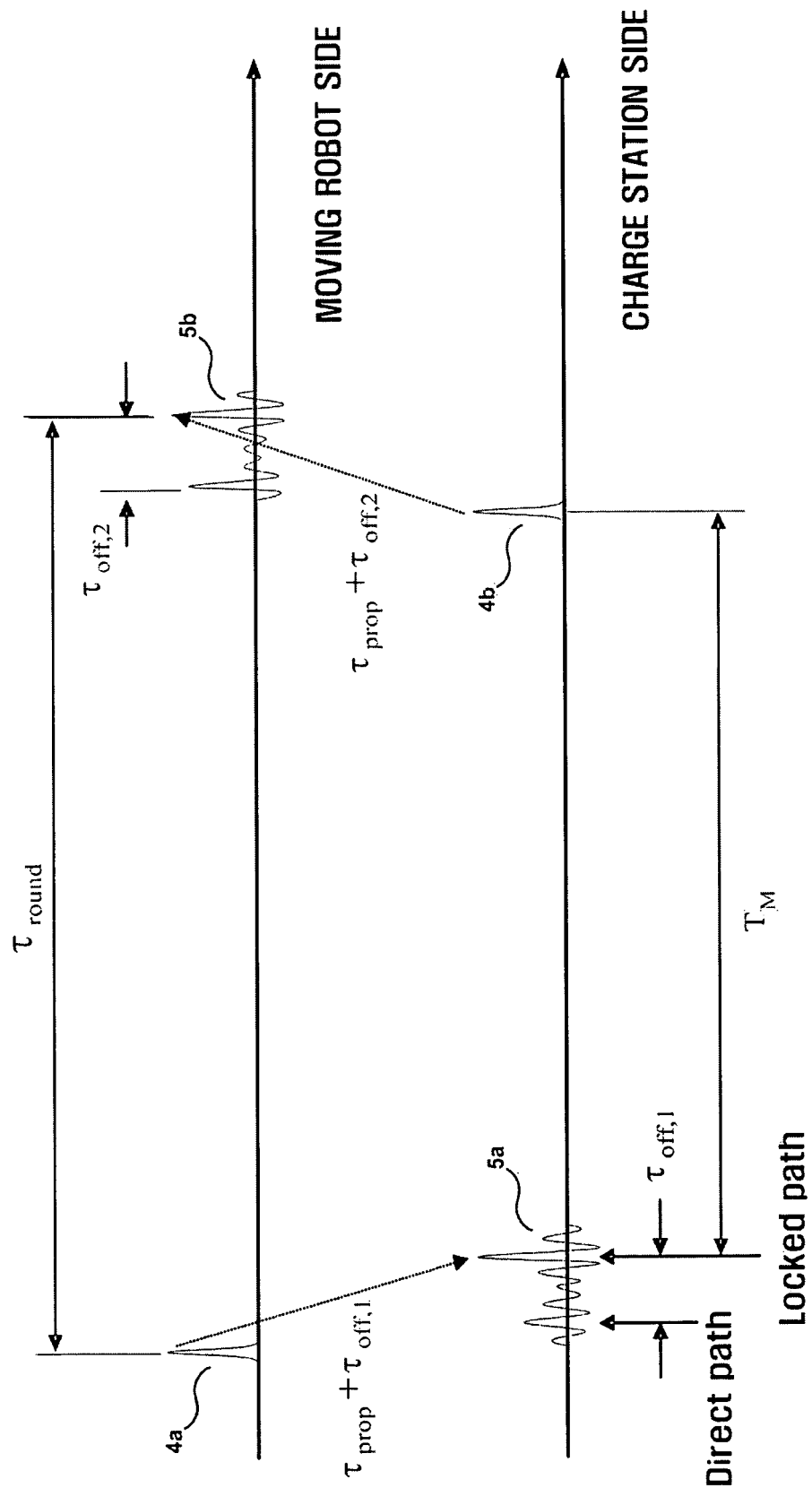
FIG. 8 is a view illustrating a method of calculating the distance between a moving robot and a charge station using a UWB signal.

FIG. 8 is a view illustrating a method of calculating the distance between the moving robot 100 of FIG. 1 and the charge station 200 of FIG. 1 by transmitting and receiving the UWB signal between the moving robot 100 and the charge station 200.

If the moving robot 100 first transmits the UWB pulse 4a to the charge station 200, the charge station 200 receives the distorted UWB signal 5a. The time from a transmitting timing point of the UWB pulse 4a to a timing point of the maximum amplitude of the distorted UWB signal 5a (subject to a locked path) is expressed as $T_{prop}+T_{off,1}$, and the time from the transmitting timing point of the UWB pulse 4a to an input timing point of the UWB signal 5a (subject to a direct path) is expressed as $T_{prop}$. The time from the receiving timing point of the UWB pulse 4a received by the charge station 200 to the timing point of the maximum amplitude is expressed as $T_{off,1}$. The time from the timing point of the maximum amplitude to a transmitting timing point of a UWB pulse 4b transmitted to the moving robot 100 by the charge station 200 is expressed as $T_M$.

When the moving robot 100 receives a UWB signal 5b from the charge station 200, the time from the initial transmitting timing point of the UWB pulse 4a to the timing point of the maximum amplitude of the received UWB signal 5b is expressed as $T_{round}$. Also, the time from the receiving timing point of the UWB signal 5b received by the moving robot 100 to the timing point of the maximum amplitude is expressed as $T_{off,2}$.

In this case, the effective time $T_{prop}$ required to transmit the UWB pulse between the transceiver 110 of the moving robot 100 and one of the transceivers 210 and 220 of the charge station 200 can be expressed as the following equation 1.

$$\tau_{prop} \approx \frac{\tau_{round} - T_M - \tau_{off,1} - \tau_{off,2}}{2} \quad \text{[Equation 1]}$$

The distance between the transceiver 110 and the transceivers 210 and 220 can be calculated by multiplication of the effective time and speed of a radio wave through the air.

Referring to FIG. 4, the traveling unit 140 provides a dynamic force that can move the moving robot 100. In the description of the present embodiment that follows, the traveling unit 140 includes a plurality of wheels and a direction control unit. However, it is to be understood that this is merely a non-limiting example and that the traveling unit 140 may be comprised of another traveling means that can move the moving robot 100.

The encoder 150 senses a rotation speed of the traveling wheels included in the traveling unit 140 to measure position variation and direction variation between a previous position of the moving robot 100 and its current position. This information is usable for dead-reckoning. The encoder 150 is installed to control motion of the robot moving in accordance with a command of position motion or direction variation. It is possible to identify the current absolute position of the robot by integrating the moved distance and direction of the robot using the encoder 150. If no integrated error occurs, it is possible to identify localization of the robot using the encoder 150 only. However, a problem occurs in that error may be accumulated per sampling of error even though the encoder can identify localization of the robot relatively exactly for a short time period in the same manner as an odometry.

Alternatively, the gyroscope may be used along with the encoder 150. The gyroscope can improve measurement performance of a direction angle by measuring angle speed of a rotating object. Thus, the accuracy of a dead-reckoning operation can be improved.

The state predictor 130 calculates the current position and the current direction angle of the moving robot 100 using distance information calculated from the distance calculator 120 and distance information and direction angle information calculated from the encoder 150.

In other words, the state predictor 130 predicts the optimized position of the moving robot 100 through the Kalman filter using motion information of the moving robot 100 obtained from the encoder 150 (a variation state obtained by the dead-reckoning) and absolute position information of the moving robot 100 obtained from the distance calculator 120. In addition, the state predictor 130 may extract a feature point from a home condition using the auxiliary sensor 170 to obtain the optimized position of the moving robot 100 using the position of the feature point as a reference coordinate. In other words, the state predictor 130 may predict the optimized position of the moving robot 100 through the Kalman filter by additionally using the information of the auxiliary sensor 170 along with the information of the encoder and the distance calculator 120. An ultrasonic sensor, an IR sensor, a camera, or other known sensors can be used as the auxiliary sensor 170.

Figure 9:
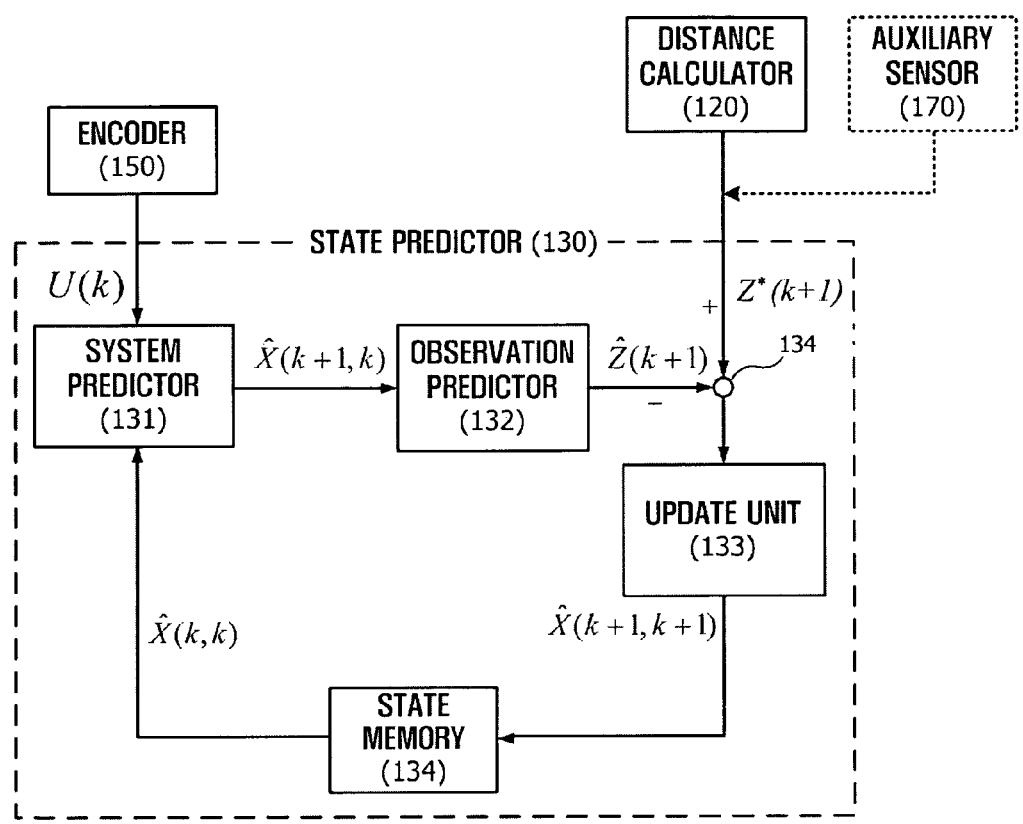
FIG. 9 is a view illustrating detailed elements of a state predictor.

FIG. 9 is a view illustrating elements of the state predictor 130 of FIG. 3. Referring to FIG. 9, the state predictor 130 includes a system predictor 131, an observation predictor 132, an update unit 133, and a state memory 134. In FIG. 9, X represents a state parameter to be predicted and Z represents an observation value.

The system predictor 131 outputs a system prediction value $\hat{X}(k+1,k)$ by receiving an existing state value $\hat{X}(k,k)$ and forward motion distance U(k) provided from the encoder 150. k is a count value that means a specific timing point and increases by 1 at a next timing point.

The observation predictor 132 converts the system prediction value $\hat{X}(k+1,k)$ into an observation prediction value $\hat{Z}(k+1)$. The distance calculator 120 provides a value $Z^*(k+1)$, which is obtained by actually measuring $\hat{Z}(k+1)$, to the state memory 134, and the state memory 134 provides a differentiated result $\hat{X}(k,k)$ of $Z^*(k+1)$ and $\hat{Z}(k+1)$ to the update unit 133.

The update unit 133 calculates a final state value $\hat{X}(k+1, k+1)$ using Kalman gain in such a way that the differentiated result becomes a minimum value. This update procedure undergoes a calculation process known in the art. Therefore, its detailed description will be omitted.

The process for system prediction and observation prediction illustrated in FIG. 9 will be described with reference to FIG. 10.

Figure 10:
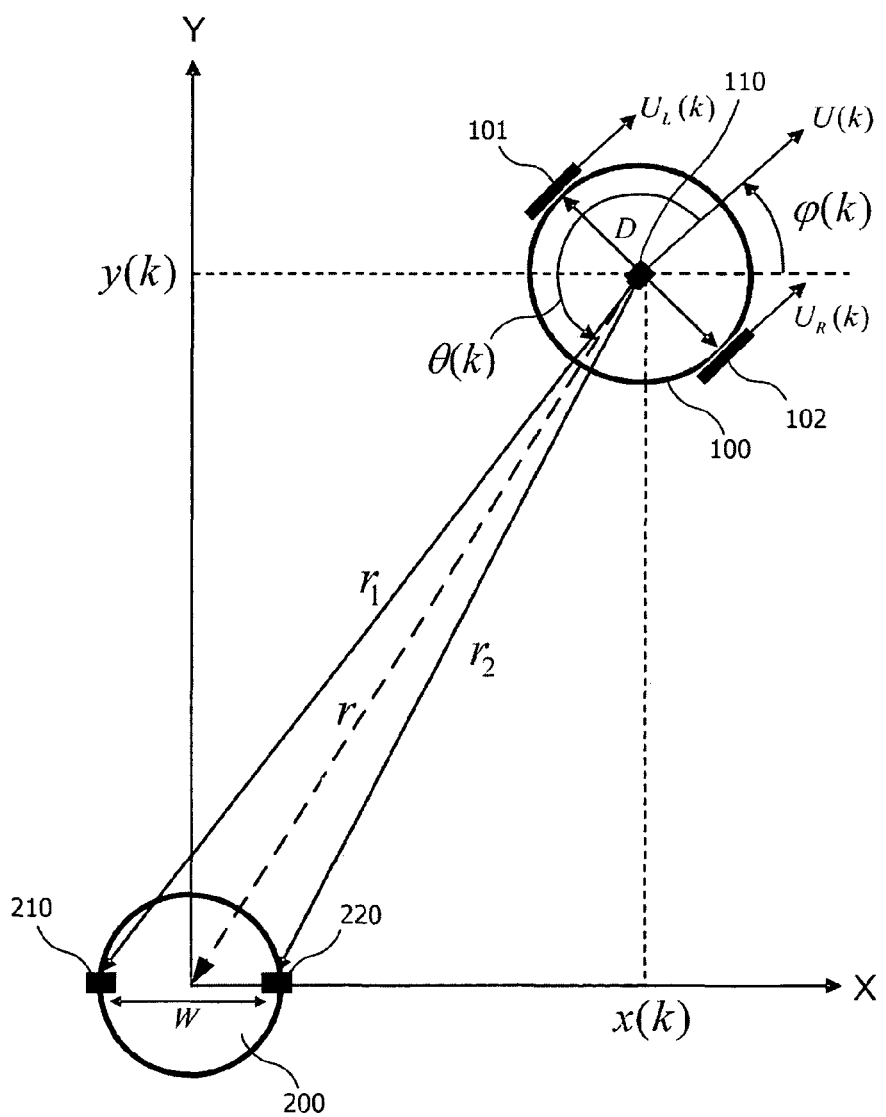
FIG. 10 is a view illustrating various parameters for system prediction and observation prediction.

Referring to FIGS. 9 and 10, a two-dimensional coordinate system x-y is predicted using the center of the charge station 200 as the origin. Then, the position of the moving robot 100 may be expressed as x(k), y(k) based on the origin. The distance between the transceiver 110 of the moving robot 100 and the first transceiver 210 of the charge station 200 is expressed as $r_1$, and the distance between the transceiver 110 and the second transceiver 220 of the charge station 200 is expressed as $r_2$. The distance between the first transceiver 210 and the second transceiver 220 on the charge station is expressed as W.

Furthermore, U(k) represents the distance where the moving robot 100 moves in a forward direction for a specific time period, and $U_L(k)$ and $U_R(k)$ represent the motion distance of a left wheel 101 and the motion distance of a right wheel 102 for the specific time period. Accordingly, U(k) can be calculated by sum of $U_L(k)$ and $U_R(k)$. The distance between the wheels 101 and 102 is expressed as D.

A direction angle viewed from the moving robot 100, i.e., an absolute angle of the moving robot is expressed as φ(k) as shown, and a relative angle of the robot with respect to the center of the charge station 200 is expressed as θ(k).

The process for system prediction and the process for observation prediction will be described using the above notation.

The state value $\hat{X}(k+1, k) = [\hat{x}(k+1, k) \ \hat{y}(k+1, k) \ \hat{\varphi}(k+1, k)]^T$ calculated and outputted from the system predictor 131 can be expressed as the following equation 2.

$$\hat{X}(k+1, k) = F(\hat{X}(k, k), U(k)) \quad \text{[Equation 2]}$$

$$F(\hat{X}(k, k), U(k)) = \begin{bmatrix} \hat{x}(k, k) + \cos\hat{\varphi}(k, k) \times U(k) \\ \hat{y}(k, k) + \sin\hat{\varphi}(k, k) \times U(k) \\ \hat{\varphi}(k, k) + \frac{U_R(k) - U_L(k)}{D} \end{bmatrix}$$

$$\text{where } U(k) = \frac{U_R(k) + U_L(k)}{2}$$

Next, $Z^*(k+1)$ output by the distance calculator 120 can be obtained by the following equation 3. In equation 3, all the values for obtaining $Z^*(k+1)$ can be obtained by measurement.

$$Z^*(k) = \begin{bmatrix} r^*(k) \\ \theta^*(k) \end{bmatrix} = \begin{bmatrix} \sqrt{x^*(k)^2 + y^*(k)^2} \\ \tan^{-1}\left(\frac{y^*(k)}{x^*(k)}\right) - \varphi(k) \end{bmatrix}$$ [Equation 3]

$$x^*(k) = \sqrt{r_1^2 - \left(\frac{r_1^2 - r_2^2 + W^2}{2W}\right)^2}$$

$$y^*(k) = \frac{r_1^2 - r_2^2}{2W}$$

$\hat{Z}(k+1)$ output from the observation predictor 132 can be calculated in accordance with the following equation 4. Equation 4 is similar to equation 3 but differs from equation 3 in that equation 4 is calculated from a value predicted as a current state value whereas equation 3 is obtained by actually measured values.

$$Z(k) = \begin{bmatrix} r(k) \\ \theta(k) \end{bmatrix} = \begin{bmatrix} \sqrt{x(k)^2 + y(k)^2} \\ \tan^{-1}\left(\frac{y(k)}{x(k)}\right) - \varphi(k) \end{bmatrix}$$ [Equation 4]

The predicted value $\hat{Z}(k+1)$ and the measured value $Z^*(k+1)$ are differentiated by the differentiator 134 and input to the update unit 133, whereby the optimally predicted state value $\hat{X}(k+1,k+1)$ can finally be obtained.

The state memory 134 stores the optimally obtained state value $\hat{X}(k+1,k+1)$, and provides the value to the system predictor 131, if requested. In this case, $\hat{X}(k+1,k+1)$ will become $\hat{X}(k,k)$.

According to the description of FIG. 9 as above, the charge station 200 is provided with two transceivers 210 and 220 as shown in FIG. 3. However, even when the charge station 200 is provided with a single transceiver, the state predictor 130 can predict the optimized position of the moving robot 100 through the Kalman filter. In this case, the input $Z^*(k)$ from the distance calculator 120 will be executed by only $r^*(k)$ not both $r^*(k)$ and $\theta^*(k)$ as shown in FIG. 3.

The input from the auxiliary sensor 170 as well as the input from the distance calculator 120 can be additionally provided to obtain the vector $Z^*(k)$. In other words, the observation values from the auxiliary sensor 170 are additionally included in the vector $Z(k)^*$ (the increased dimension of the vector $Z^*(k)$), and then the optimized state value $\hat{X}(k+1,k+1)$ can be obtained through the aforementioned procedure.

In more detail, if a proximity obstacle sensor such as an ultrasonic sensor is used, simultaneous localization and mapbuilding (SLAM) can be realized. The SLAM allows the robot to simultaneously recognize its position and the position of the feature point, and allows the robot to automatically generate a map of the feature point and search its position if the robot is first driven in a room. To realize the SLAM, the Kalman filter can be used as follows. First, the state parameter to be predicted is defined as the following equation 5 which includes the position of the feature point $\hat{X}(k+1,k)$ of equation 2.

$$\hat{\bar{X}}(k+1,k) = [\hat{x}(k+1,k)\hat{y}(k+1,k)\hat{\varphi}(k+1,k)p_1p_2\cdots p_N]^T$$ [Equation 5]

$$\begin{bmatrix} \hat{X}(k+1,k) \\ p_1 \\ \vdots \\ p_N \end{bmatrix} = \begin{bmatrix} \partial F/\partial X & 0 & \cdots & 0 \\ 0 & I_{p_1} & \cdots & 0 \\ \vdots & \vdots & \ddots & 0 \\ 0 & 0 & 0 & I_{p_N} \end{bmatrix} \begin{bmatrix} \hat{X}(k,k) \\ p_1 \\ \vdots \\ p_N \end{bmatrix}$$

In equation 5, $p_1, p_2, \ldots p_N$ are x and y coordinate values of the feature point to be predicted, and $\partial F/\partial X$ is obtained by making F of equation 2 linear with respect to the parameter X. The operation of the system predictor 131 of FIG. 9 can be expressed by equation 5.

Next, the observation predictor 132 of FIG. 9 will be described. The output value Z(k) of the observation predictor is defined as the following equation 6.

$$Z(k) = [r(k)\theta(k)z_1z_2\ldots z_N]^T$$ [Equation 6]

In equation 6, $z_i$ is an observation value of the $i_{th}$ feature point and is expressed as $z_i = H_i(\bar{X}(k))$, where $H_i$ is a function that connects the state parameter $\bar{X}(k)$ with the observation value $z_i$. $z_i$ becomes a coordinate value of a corner point measured through the ultrasonic sensor. If the Kalman filter is designed as shown in FIG. 9, the position of the robot and the feature point coordinate of the peripheral condition can simultaneously be calculated.

Unlike the case where the optimized state value is calculated by the operation of the state predictor 130, if an unexpected circumstance, such as kidnapping, sensor noise, and error operation in recognition caused by variation of the condition, occurs, the result calculated by the state predictor 130 causes a significant error.

In the present embodiment, localization having high reliability is performed under such an unexpected circumstance so as to avoid error operation of the moving robot 100. To this end, the present embodiment provides a standard of judgment as to whether relocation is needed due to significant error.

Figure 11:
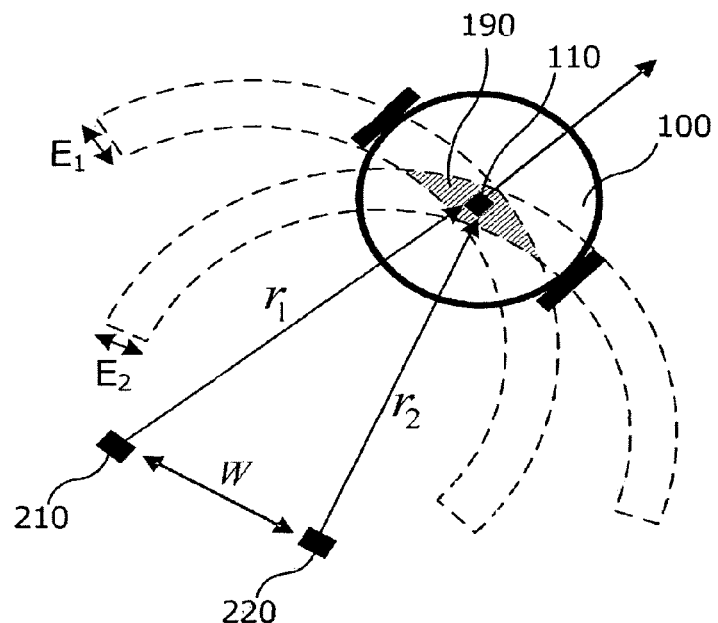
FIG. 11 is a view illustrating an effective area according to the embodiment of an present invention.

Referring to FIG. 11, the distance $r_1$ between the transceiver 110 and the first transceiver 210 and the distance $r_2$ between the transceiver 110 and the second transceiver 220 may have certain error bands $E_1$ and $E_2$, respectively. $E_1$ and $E_2$ may be determined by experiments. If a circle is drawn by reflecting $E_1$ in $r_1$ around the first transceiver 210 and another circle is drawn by reflecting $E_2$ in $r_2$ around the second transceiver 220, a diamond shaped crossing area 190 (hereinafter, defined as "effective area") occurs around the transceiver 110. If the current position predicted by the state predictor 130 belongs to (i.e., is within) the above area 190, the current position is reliable. Conversely, if the current position is not within the area 190, it is determined that the current position is predicted in error (i.e., is unreliable).

The relocation determining unit 160 of FIG. 4 determines whether the current position is reliable or should be reset according to whether the current state value is within the effective area 190, in accordance with the standard of judgment. If $E_1$ and $E_2$ have the same value $2\mu$, the standard of judgment can be obtained by the following equation 7.

$$(r_1 - \mu)^2 \leq x(k)^2 + \left(y(k) + \frac{w}{2}\right)^2 \leq (r_1 + \mu)^2$$ [Equation 7]

$$(r_2 - \mu)^2 \leq x(k)^2 + \left(y(k) - \frac{w}{2}\right)^2 \leq (r_2 + \mu)^2$$

If $E_1$ and $E_2$ have different values from each other, p at the left side has a different value from that of p at the right side.

To determine relocation, the charge station is provided with two transceivers 210 and 220 as shown in FIG. 11. However, one transceiver may be provided in the charge station, and the other transceiver may be provided in an accessory type so that it may be fixed to a wall or may be arranged in a desired position by the user.

Figure 12:
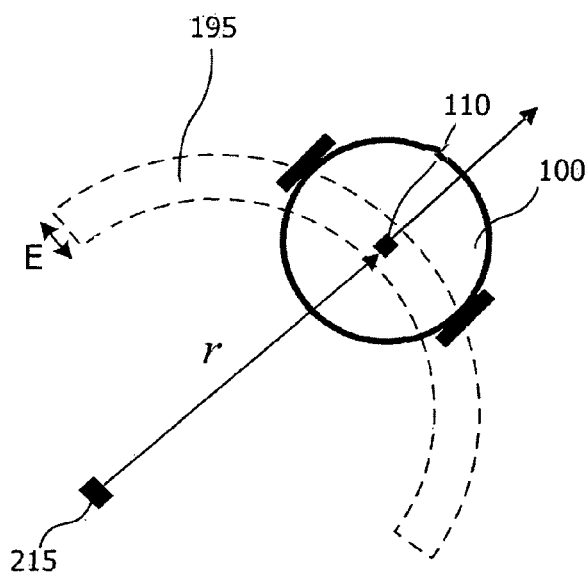
FIG. 12 is a view illustrating another effective area according to an embodiment of the present invention.

Also, relocation can be determined by one transceiver. FIG. 12 illustrates one non-limiting example of relocation determination using one transceiver.

One transceiver 215 can calculate the distance r with the transceiver 110 provided in the moving robot 100 through signal transmission and reception. At this time, the effective area 195 can be expressed as the following equation 8.

$$(r-\mu)^2 \leq x(k)^2 + y(k)^2 \leq (r+\mu)^2 \quad \text{[Equation 8]}$$

If the positions x(k) and y(k) of the moving robot 100 calculated by the state predictor 130 satisfy the equation 8, it can be determined that the calculated positions are reliable. In the embodiment of FIG. 12, the effective area 195 becomes greater than that of FIG. 11 in which two transceivers are used. However, relocation can be determined by one transceiver as shown in FIG. 12 in that the relocation determination is used to compensate the position of the robot calculated by sensor fusion. As a result of relocation determination, if the current position according to the current state value output from the state predictor 130 is within the effective area, the relocation determining unit 160 stores the current state value in the state memory 134.

However, if the current state value output from the state predictor 130 is not within the effective area, it is difficult for the state predictor 130 to rely on the result calculated through the Kalman filter. Accordingly, the relocation determining unit 160 allows a relocation unit 180 to obtain the exact current position through separate sensing. Since the relocation unit 180 is used exceptionally as above, the unit is selected so as to yield a relatively exact result even though it obtains the current position through a complicated procedure which takes a relatively long time.

To this end, the auxiliary sensor 170, such as a nearby obstacle sensor, a long range sensor, and a camera, and the distance calculator 120 can be used as the relocation unit 180.

Hereinafter, relocation operations of the relocation unit 180 will be described with reference to FIG. 13 to FIG. 15.

Figure 13:
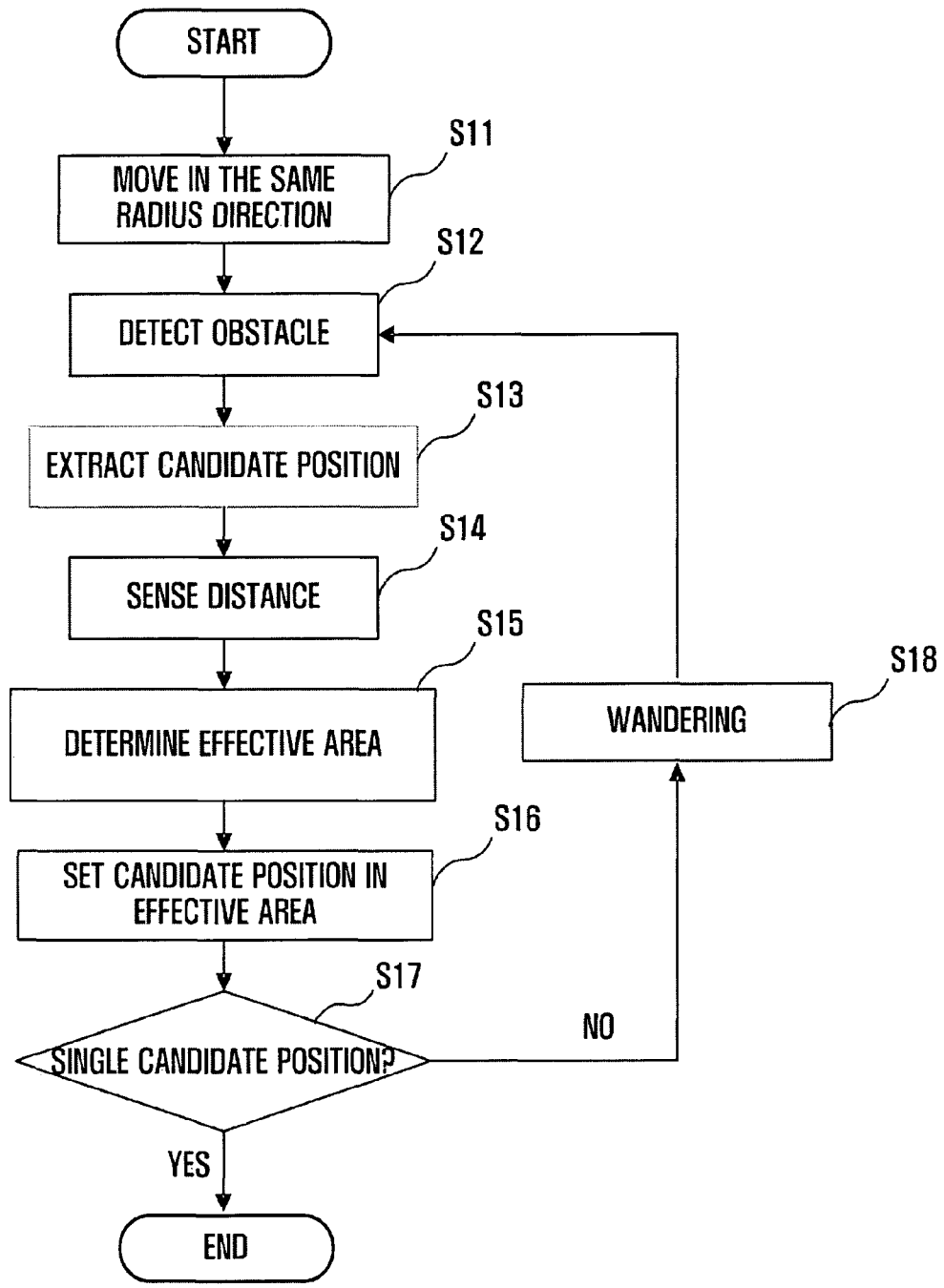
FIG. 13 is a flowchart illustrating the operation in the case where a nearby obstacle sensor is used as an auxiliary sensor.

FIG. 13 is a flowchart illustrating the operation when the nearby obstacle sensor is used as the relocation unit 180. First, the moving robot 100 moves along a radius around a certain position (operation S11), wherein the radius is the same as that of the certain position. If an obstacle is detected during movement of the moving robot 100 S12, previously defined candidate positions are extracted (operation S13). Next, as shown in FIG. 11, the effective area is determined through range sensing with the charge station 200 (operations S14 and S15). Among the extracted candidate positions, the candidate position belonging to the determined effective area is set (operation S16). If the set candidate position is only one (Yes in operation S17), the process ends. If not so, wandering is again performed for re-sensing (operation S18).

Figure 14:
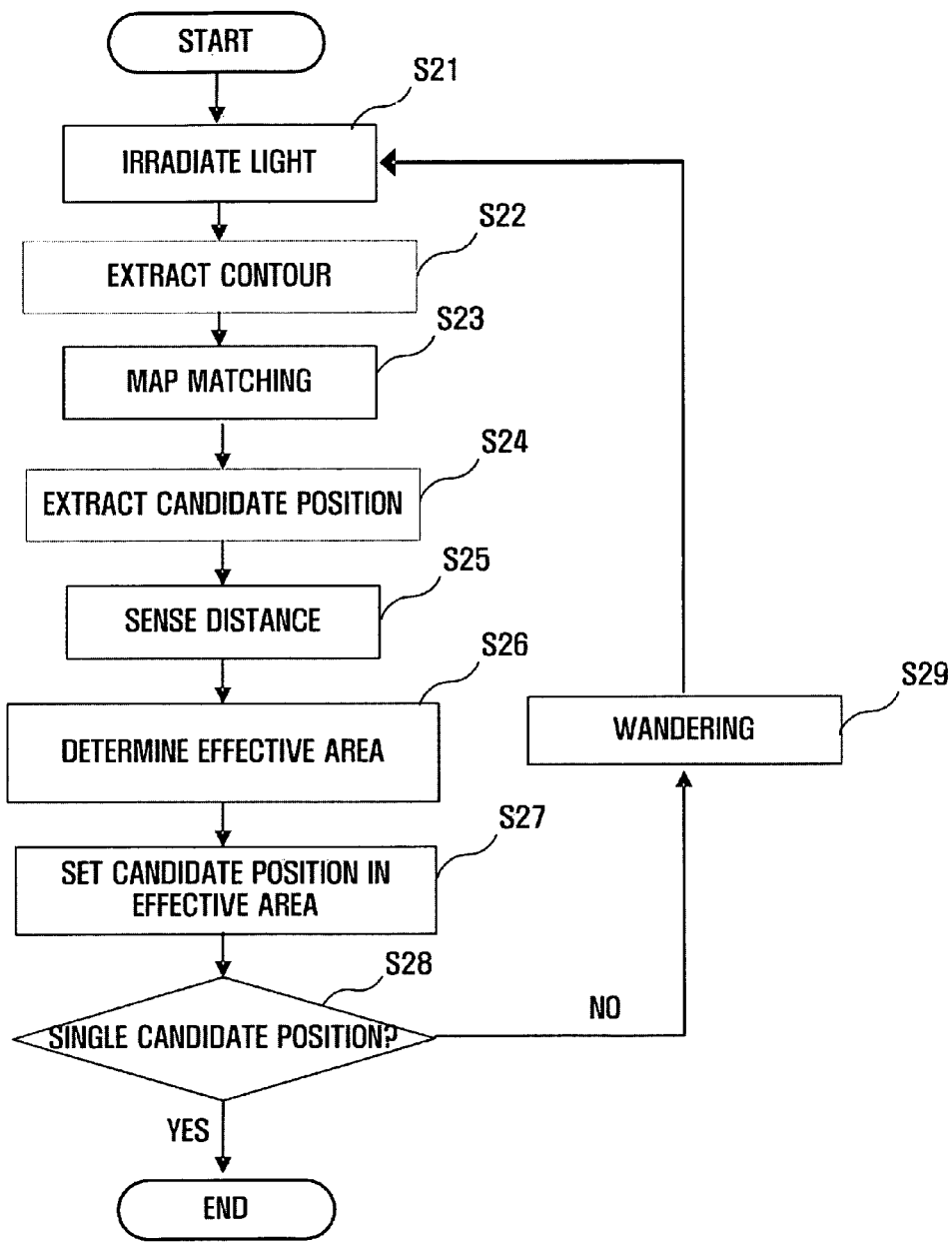
FIG. 14 is a flowchart illustrating the operation when a laser sensor is used as an auxiliary sensor.

FIG. 14 is a flowchart illustrating the operation in the case where the laser sensor is used as the relocation unit 180. If a light source such as laser irradiates light in a certain direction, a contour where the light is irradiated is extracted to find a specific position. In other words, the moving robot 100 irradiates the light in a certain direction (operation S21). Then, the moving robot 100 extracts the contour of the irradiated light (operation S22), and matches the extracted contour with a previously prepared map (operation S23). Afterwards, the moving robot 100 extracts the matched candidate position (operation S24). Since succeeding operations (operations S25-28) are the same as those of FIG. 13, their description is omitted. Instead of the laser sensor, a distance sensor based on the radio wave mentioned above may be used.

Figure 15:
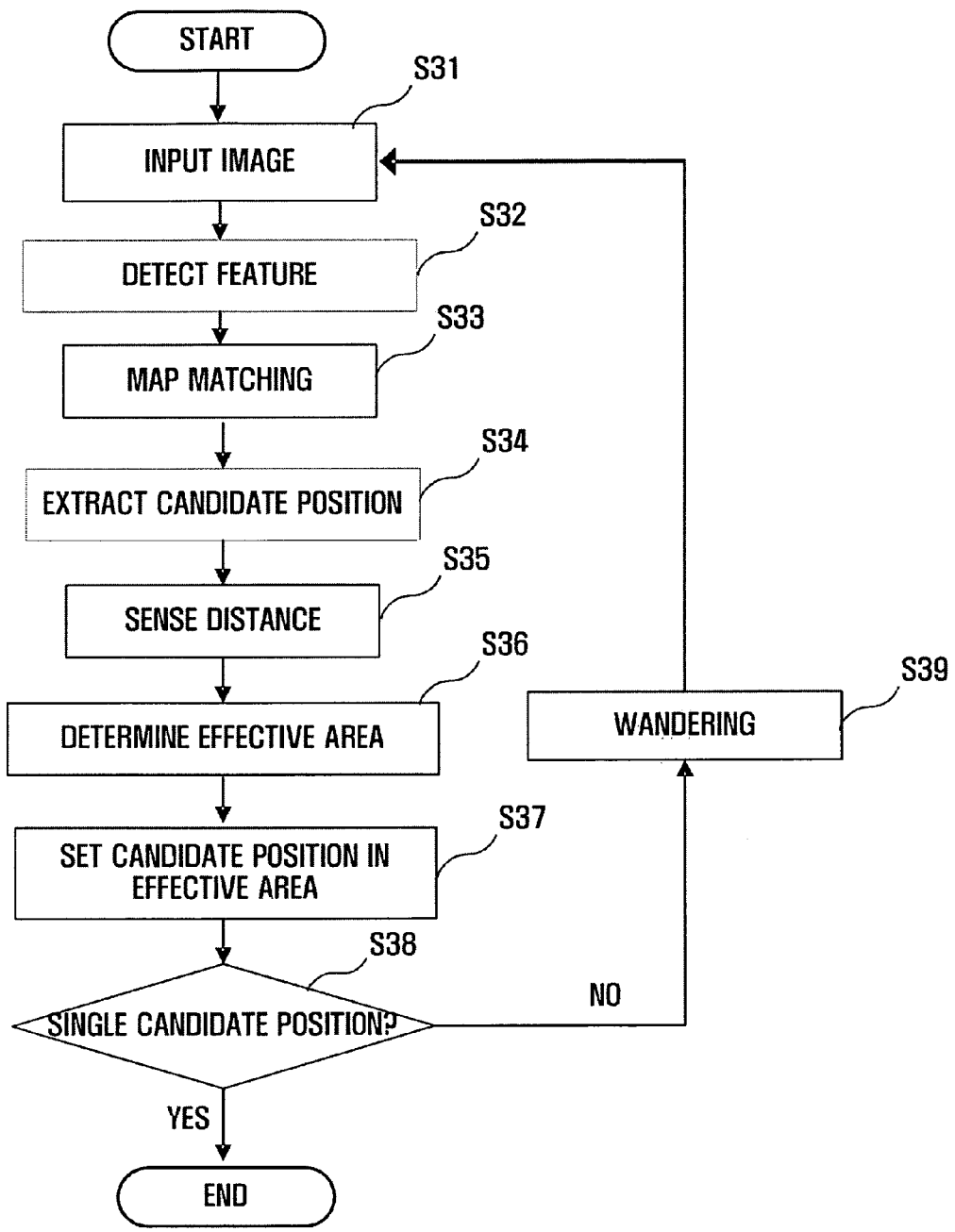
FIG. 15 is a flowchart illustrating the operation when a camera is used as an auxiliary sensor.

FIG. 15 is a flowchart illustrating the operation in the case where the camera is used as the relocation unit 180. Referring to FIG. 15, after an image in a certain direction is taken by the camera, its feature is analyzed to find a specific position. In other words, the moving robot 100 receives an image taken in a certain direction by the camera (operation S31). Then, the moving robot 100 detects a feature of the image (operation S32), and matches the detected feature with a previously prepared map (operation S33). Afterwards, the moving robot 100 extracts the mapped candidate position (operation S34). Since succeeding operations (operations S35-S39) are the same as those of FIG. 13, their description is omitted.

The respective constituent elements of FIG. 4 or FIG. 9 have meant software or hardware such as a field-programmable gate array (FPGA) or an application specific integrated circuit (ASIC). However, it is to be understood that the respective constituent elements are not limited to such software or hardware. In other words, the respective constituent elements may be constructed to reside in an addressable storage medium or to execute one or more processors. Functions provided in the respective constituent elements may be separated into further detailed constituent elements or combined into one constituent element, all of which perform specified functions.

According to the above-described embodiments of the present invention, the moving robot is robust to a measurement error of the distance sensor, failure of the signal, kidnapping, and so on, and can stably be operated under the home environment. Also, the moving robot reduces an error, which may be generated more than a certain range, by checking whether relocation is required.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of reckoning a position of a moving robot, comprising:
   performing dead-reckoning to determine a variation state in accordance with motion of the moving robot;
   sensing a distance between the moving robot and at least one fixed position to calculate an absolute position of the moving robot; and
   predicting an optimized current position of the moving robot using the variation state and the absolute position,
   wherein the sensing the distance is executed by transmission and reception of a radio wave between a transceiver in the moving robot and respective transceivers at the at least one fixed position, and
   wherein the distance between the moving robot and at least one fixed position is calculated based on an effective time and a speed of the radio wave, and
   the effective time being calculated by excluding, from a total roundtrip time, the time from a receiving timing point of a distorted radio wave received by the at least one fixed position to a timing point of the maximum amplitude of the distorted radio wave received by the at least one fixed position, the time from the receiving timing point of the distorted radio wave received by the moving robot to the timing point of the maximum amplitude of the distorted radio wave received by the moving robot, and a predetermined period of time, and dividing a result by two,
   wherein the receiving timing point of the distorted radio wave is an input timing point indicating a time when the distorted radio wave is first received, subject to a direct path, the input timing point occurring prior to the timing point of the maximum amplitude.

2. The method of claim 1, wherein the performing is executed by an encoder and/or a gyroscope.

3. The method of claim 1, wherein the at least one fixed position is in a charge station of the moving robot.

4. The method of claim 1, wherein the at least one fixed position includes a fixed position in a charge station and another fixed position.

5. The method of claim 1, wherein the radio wave is an ultra wide band (UWB) signal.

6. The method of claim 1, wherein the predicting comprises calculating a current state value through a Kalman filter using the variation state and the absolute position.

7. The method of claim 1, wherein the predicting comprises calculating a current state value through a Kalman filter using the variation state, the absolute position and position information sensed by an auxiliary sensor.

8. The method of claim 7, wherein the auxiliary sensor comprises at least one of a nearby obstacle sensor, a laser sensor, a distance sensor, and a camera.

9. The method of claim 7, further comprising obtaining a feature point of the moving robot using the nearby obstacle sensor as the auxiliary sensor, wherein the position information sensed by the auxiliary sensor includes x and y coordinate values of the feature point, and the feature point is a point in the environment sensed by the auxiliary sensor.

10. A method of reckoning a position of a moving robot, comprising:
predicting an absolute position of the moving robot using at least one sensor;
determining whether the predicted absolute position is within an effective area calculated from a signal received from at least one fixed transceiver; and
performing relocation in which the absolute position is reset, when the predicted absolute position is not within the effective area,
wherein the predicting an absolute position of the moving robot using at least one sensor comprises sensing a distance between the moving robot and at least one fixed position to calculate an absolute position of the moving robot;
wherein the sensing a distance is executed by transmission and reception of a radio wave between a transceiver in the moving robot and respective transceivers at the at least fixed position, and
wherein the distance between the moving robot and at least one fixed position is calculated based on an effective time and a speed of the radio wave, and
the effective time being calculated by excluding, from a total roundtrip time, the time from a receiving timing point of a distorted radio wave received by the at least one fixed position to a timing point of the maximum amplitude of the distorted radio wave received by the at least one fixed position, the time from the receiving timing point of the distorted radio wave received by the moving robot to the timing point of the maximum amplitude of the distorted radio wave received by the moving robot, and a predetermined period of time, and dividing a result by two,
wherein the receiving timing point of the distorted radio wave is an input timing point indicating a time when the distorted radio wave is first received, subject to a direct path, the input timing point occurring prior to the timing point of the maximum amplitude.

11. The method of claim 10, wherein the effective area is an area of overlap when a circle is drawn by reflecting an error band $E_1$ in a radius $r_1$ around a first transceiver at a first position of at least two fixed positions and another circle is drawn by reflecting an error band $E_2$ in a radius $r_2$ around a second transceiver at a second position of the at least two fixed positions, and
wherein radius $r_1$ represents a distance between the moving robot and the first transceiver and radius $r_2$ represents a distance between the moving robot and the second transceiver.

12. The method of claim 11, wherein the effective area simultaneously satisfies the following equations:

$$(r_1-\mu_1)^2 \le x(k)^2+(y(k)+W/2)^2 \le (r_1+\mu_2)^2$$

$$(r_2-\mu_1)^2 \le x(k)^2+(y(k)-W/2)^2 \le (r_2+\mu_2)^2, \text{ and}$$

wherein $\mu_1$ represents $E_1/2$, $\mu_2$ represents $E_2/2$, x(k) represents an X-axis directional position of the moving robot in a state of k, y(k) represents a Y-axis directional position in a state of k, and W represents a distance between the first transceiver and the second transceiver.

13. The method of claim 10, wherein the effective area is an area of a circle drawn by reflecting an error band E in a radius r around one fixed transceiver, and
wherein radius r represents the distance between the moving robot and the transceiver.

14. The method of claim 13, wherein the effective area satisfies the following equation:

$$(r-\mu)^2 \le x(k)^2+y(k)^2 \le (r+\mu)^2, \text{ and}$$

wherein p represents E/2, x(k) represents an X-axis directional position of the moving robot in a state of k, and y(k) represents a Y-axis directional position in a state of k.

15. The method of claim 10, wherein the performing relocation comprises obtaining a current position of the moving robot using a separate auxiliary sensor.

16. The method of claim 15, wherein the auxiliary sensor comprises at least one of a nearby obstacle sensor, a laser sensor, a distance sensor, and a camera.

17. A method of reckoning a position of a moving robot, comprising:
performing dead-reckoning to determine a variation state in accordance with motion of the moving robot;
calculating an absolute position of the moving robot by sensing a distance between the moving robot and at least one fixed position;
predicting an optimized current position of the moving robot using the variation state and the absolute position;
determining whether the optimized current position is within a specified effective area; and
correcting the optimized current position of the moving robot in accordance with a result of the determining,
wherein the sensing the distance is executed by transmission and reception of a radio wave between a transceiver in the moving robot and respective transceivers at the at least fixed position, and
wherein the distance between the moving robot and at least one fixed position is calculated based on an effective time and a speed of the radio wave, and
the effective time being calculated by excluding, from a total roundtrip time, the time from a receiving timing point of a distorted radio wave received by the at least one fixed position to a timing point of the maximum amplitude of the distorted radio wave received by the at least one fixed position, the time from the receiving timing point of the distorted radio wave received by the moving robot to the timing point of the maximum amplitude of the distorted radio wave received by the moving robot, and a predetermined period of time, and dividing a result by two, wherein the receiving timing point of the distorted radio wave is an input timing point indicating a time when the distorted radio wave is first received, subject to a direct path, the input timing point occurring prior to the timing point of the maximum amplitude.

18. An apparatus for reckoning a position of a moving robot, comprising:
a dead-reckoning section determining a variation state in accordance with motion of the moving robot;
a distance calculator calculating an absolute position of the moving robot by sensing a distance between the moving robot and at least one fixed position; and
a state predictor predicting an optimized current position of the moving robot using the variation state and the absolute position as input values of a Kalman filter,
wherein the sensing the distance is executed by transmission and reception of a radio wave between a transceiver in the moving robot and respective transceivers at the at least fixed position, and
wherein the distance between the moving robot and at least one fixed position is calculated based on an effective time and a speed of the radio wave, and
the effective time being calculated by excluding, from a total roundtrip time, the time from a receiving timing point of a distorted radio wave received by the at least one fixed position to a timing point of the maximum amplitude of the distorted radio wave received by the at least one fixed position, the time from the receiving timing point of the distorted radio wave received by the moving robot to the timing point of the maximum amplitude of the distorted radio wave received by the moving robot, and a predetermined period of time, and dividing a result by two,
wherein the receiving timing point of the distorted radio wave is an input timing point indicating a time when the distorted radio wave is first received, subject to a direct path, the input timing point occurring prior to the timing point of the maximum amplitude.

19. The apparatus of claim 18, wherein the dead-reckoning section comprises an encoder and/or a gyroscope.

20. The apparatus of claim 18, wherein the at least one fixed position is at a charge station of the moving robot.

21. The apparatus of claim 18, wherein the at least one fixed position is a fixed position at a charge station and another fixed position.

22. The apparatus of claim 18, wherein the state predictor calculates a current state value through a Kalman filter using the variation state and the absolute position.

23. The apparatus of claim 18, wherein the state predictor calculates a current state value through a Kalman filter using the variation state, the calculated absolute position and position information sensed by an auxiliary sensor.

24. An apparatus of reckoning a position of a moving robot, comprising:
a predictor predicting an absolute position of the moving robot using at least one sensor;
a relocation determining unit determining whether the absolute position is within an effective area calculated from a signal received from at least one fixed transceiver; and
a relocation unit performing relocation in which the absolute position is reset, when the predicted absolute position is not within the effective area,
wherein the predictor comprises a distance calculator calculating an absolute position of the moving robot by sensing a distance between the moving robot and at least one fixed position,
wherein the sensing the distance is executed by transmission and reception of a radio wave between a transceiver in the moving robot and respective transceivers at the at least fixed position, and
wherein the distance between the moving robot and at least one fixed position is calculated based on an effective time and a speed of the radio wave, and
the effective time being calculated by excluding, from a total roundtrip time, the time from a receiving timing point of a distorted radio wave received by the at least one fixed position to a timing point of the maximum amplitude of the distorted radio wave received by the at least one fixed position, the time from the receiving timing point of the distorted radio wave received by the moving robot to the timing point of the maximum amplitude of the distorted radio wave received by the moving robot, and a predetermined period of time, and dividing a result by two,
wherein the receiving timing point of the distorted radio wave is an input timing point indicating a time when the distorted radio wave is first received, subject to a direct path, the input timing point occurring prior to the timing point of the maximum amplitude.

25. The apparatus of claim 24, wherein the effective area is an area of overlap when a circle is drawn by reflecting an error band $E_1$ in a radius $r_1$ around a first transceiver at a first position of at least two fixed positions and another circle is drawn by reflecting an error band $E_2$ in a radius $r_2$ around a second transceiver at a second position of the at least two fixed positions, and
wherein radius $r_1$ represents a distance between the moving robot and the first transceiver and radius $r_2$ represents a distance between the moving robot and the second transceiver.

26. The apparatus of claim 24, wherein the effective area is an area of a circle drawn by reflecting an error band E in a radius r around one fixed transceiver, and
wherein radius r represents a distance between the moving robot and the transceiver.

27. The apparatus of claim 24, wherein the relocation unit obtains a current position of the moving robot using a separate auxiliary sensor.

28. The apparatus of claim 27, wherein the auxiliary sensor comprises at least one of a nearby obstacle sensor, a laser sensor, a distance sensor, and a camera.

29. An apparatus of reckoning a position of a moving robot, comprising:
a dead-reckoning section performing dead-reckoning to determine a variation state in accordance with motion of the moving robot;
a distance calculator calculating an absolute position of the moving robot by sensing a distance between the moving robot and at least one fixed position;
a state predictor predicting an optimized current position of the moving robot using the variation state and the absolute position;
a relocation determining unit determining whether the optimized current position is within a specified effective area; and
a relocation unit correcting the optimized current position of the moving robot in accordance with a result of the determining,
wherein the sensing the distance is executed by transmission and reception of a radio wave between a transceiver in the moving robot and respective transceivers at the at least fixed position, and wherein the distance between the moving robot and at least one fixed position is calculated based on an effective time and a speed of the radio wave, and the effective time being calculated by excluding, from a total roundtrip time, the time from a receiving timing point of a distorted radio wave received by the at least one fixed position to a timing point of the maximum amplitude of the distorted radio wave received by the at least one fixed position, the time from the receiving timing point of the distorted radio wave received by the moving robot to the timing point of the maximum amplitude of the distorted radio wave received by the moving robot, and a predetermined period of time, and dividing a result by two, wherein the receiving timing point of the distorted radio wave is an input timing point indicating a time when the distorted radio wave is first received, subject to a direct path, the input timing point occurring prior to the timing point of the maximum amplitude.

* * * * *